(12) United States Patent
Carr et al.

(10) Patent No.: US 7,515,899 B1
(45) Date of Patent: Apr. 7, 2009

(54) DISTRIBUTED GRID COMPUTING METHOD UTILIZING PROCESSING CYCLES OF MOBILE PHONES

(75) Inventors: Hollie Carr, Southhampton (GB); Peter Mattison, Westhampnett (GB); Christopher E. Sharp, Hants (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/108,203

(22) Filed: Apr. 23, 2008

(51) Int. Cl.
*G06F 9/45* (2006.01)
*G06F 15/00* (2006.01)

(52) U.S. Cl. .................... 455/403; 455/412.1; 455/418; 455/466; 702/33; 709/214; 712/10; 712/11; 712/16; 712/20

(58) Field of Classification Search ............... 455/403, 455/412.1, 418, 466; 702/33; 709/214; 712/10, 11, 16, 20
See application file for complete search history.

(56) References Cited

U.S. PATENT DOCUMENTS

| | | | | |
|---|---|---|---|---|
| 5,588,152 A * | 12/1996 | Dapp et al. | ............. | 712/16 |
| 5,590,345 A * | 12/1996 | Barker et al. | ............. | 712/11 |
| 5,625,836 A * | 4/1997 | Barker et al. | ............. | 709/214 |
| 5,708,836 A * | 1/1998 | Wilkinson et al. | ............. | 712/20 |
| 5,710,935 A * | 1/1998 | Barker et al. | ............. | 712/20 |
| 5,713,037 A * | 1/1998 | Wilkinson et al. | ............. | 702/33 |
| 5,717,943 A * | 2/1998 | Barker et al. | ............. | 712/20 |
| 5,717,944 A * | 2/1998 | Wilkinson et al. | ............. | 712/20 |
| 5,734,921 A * | 3/1998 | Dapp et al. | ............. | 712/10 |
| 5,752,067 A * | 5/1998 | Wilkinson et al. | ............. | 712/16 |
| 5,754,871 A * | 5/1998 | Wilkinson et al. | ............. | 712/20 |
| 6,496,871 B1 * | 12/2002 | Jagannathan et al. | ........ | 719/317 |
| 6,681,242 B1 * | 1/2004 | Kumar et al. | ............. | 718/104 |
| 6,920,331 B1 | 7/2005 | Sim et al. | | |
| 6,996,699 B2 * | 2/2006 | Chrysanthakopoulos et al. | . . | 712/35 |
| 7,020,678 B1 * | 3/2006 | Hubbard | .............. | 709/201 |
| 7,058,944 B1 * | 6/2006 | Sponheim et al. | ......... | 718/100 |
| 7,086,055 B2 * | 8/2006 | Stringham | ............. | 718/102 |
| 7,178,049 B2 * | 2/2007 | Lutter | .............. | 714/1 |

(Continued)

FOREIGN PATENT DOCUMENTS

EP    1 605 595 A    12/2005

(Continued)

OTHER PUBLICATIONS

"Supporting Mobile Multimedia Services with Intermittently Available Grid Resources," Huang, Yun, et al.,High Performance Computing-HiPC 2003; 10th Int'l Conference, Hyderabad, India; Dec. 17-20, 2003.

(Continued)

*Primary Examiner*—William D Cumming
(74) *Attorney, Agent, or Firm*—Oppenheimer Wolff & Donnelly LLP

(57) ABSTRACT

Additional computing power is captured using the idle processing power of mobile phones incorporated into a grid computing system, wherein the system is capable of pushing projects out to available mobile phones for processing during idle operation times. To further efficiently utilize the unused processing cycles of mobile phones, a unique protocol is utilized to coordinate processing tasks which makes use of existing short messages techniques to communicate projects. The unique protocol is combination of bootstrapping using standard compression techniques along with an adaptive compression scheme.

1 Claim, 2 Drawing Sheets

U.S. PATENT DOCUMENTS

| | | | |
|---|---|---|---|
| 7,395,536 B2 * | 7/2008 | Verbeke et al. | 718/100 |
| 7,434,000 B1 * | 10/2008 | Barreh et al. | 711/118 |
| 7,437,733 B2 * | 10/2008 | Manzano | 719/315 |
| 2002/0120660 A1 * | 8/2002 | Hay et al. | 709/100 |
| 2002/0184288 A1 * | 12/2002 | Vargas et al. | 709/100 |
| 2004/0192354 A1 | 9/2004 | Sawano | |
| 2005/0015571 A1 | 1/2005 | Kaufman et al. | |
| 2005/0076338 A1 * | 4/2005 | Malik | 718/100 |
| 2005/0132372 A1 * | 6/2005 | Vargas et al. | 718/100 |
| 2006/0031509 A1 | 2/2006 | Ballette et al. | |
| 2006/0070067 A1 | 3/2006 | Lowery | |
| 2006/0107266 A1 * | 5/2006 | Martin et al. | 718/100 |
| 2006/0224597 A1 | 10/2006 | Fitzpatrick et al. | |
| 2006/0294238 A1 | 12/2006 | Naik et al. | |
| 2007/0198977 A1 * | 8/2007 | Abernethy et al. | 718/100 |
| 2007/0250446 A1 | 10/2007 | Zalewski | |
| 2007/0300225 A1 * | 12/2007 | Macbeth et al. | 718/100 |
| 2008/0005327 A1 | 1/2008 | Hays | |
| 2008/0005736 A1 * | 1/2008 | Apacible et al. | 718/100 |
| 2008/0028405 A1 * | 1/2008 | Martin et al. | 718/102 |
| 2008/0209416 A1 * | 8/2008 | De Souza et al. | 718/100 |
| 2008/0250408 A1 * | 10/2008 | Tsui et al. | 718/100 |
| 2008/0256539 A1 * | 10/2008 | Barde et al. | 718/100 |

FOREIGN PATENT DOCUMENTS

KR   2006054856   5/2006

OTHER PUBLICATIONS

"An Adaptive Mobile System Using Mobile Grid Computing in Wireless Network," Oh, Jehwan et al., Computational Science and Its Applications-ICCSA 2006; Int'l Conference, Glasgow, UK, May 8-11, 2006 (Proceedings, Part V).

"A Grid Service Infrastructure for Mobile Devices"; Guan, Tao, et al.; Proceedings of the First International Conference on Semantics Knowledge and Grid, p. 42 (2005).

"A Collaborative Problem-Solving Framework for Mobile Devices"; Kurkovsky, Stan, et al.; ACMSE '04, Apr. 2-3, 2004, Huntsville, AL, USA.

"Short Message Service in a Grid-Enabled Computing Environment"; Xu, Fenglian, et al.; EURO-PAR 2003 Parallel Processing, Lecture Notes in Computer Science, Jun. 2004.

"Load Distribution in Mobile Grids," Ballette, Marco, Proquest Dissertations and Theses 2006. Section 0873, Part 0544 (Ph.D. Dissertation) England, Unviersity of Essex (UK) 2006, Publication No. AAT C826879.

"Mobile OGSI.NET: Grid Computing on Mobile Devices"; Chu, David C., et al.; *5th IEEE/ACM Int'l Workshop on Grid Computing*, Nov. 8, 2004.

* cited by examiner

US 7,515,899 B1

DISTRIBUTED GRID COMPUTING METHOD UTILIZING PROCESSING CYCLES OF MOBILE PHONES

FIELD OF THE INVENTION

The present invention relates to distributed computing systems which are capable of efficiently utilizing processing capabilities of multiple devices. More specifically, the present invention provides a grid computing system, and related method of use, which utilizes available computing cycles of mobile phones.

BACKGROUND OF THE INVENTION

Grid computing is presently utilized to address many complex computing tasks. Generally speaking, a grid computing system includes a number of separate computing devices, all registered to provide computing capacity when necessary. Generally speaking, computing devices on the grid are made available at certain times to take on defined computing tasks when not otherwise being used. In one typical method, availability is invoked by screen savers operating on the remote computing device. More specifically, the starting and operation of a screen saver thus indicates that the computing device is not presently being utilized and available for additional tasks.

The use of idle computing power creates a general conflict in society. Generally speaking, this conflict involves computing needs versus power consumption. Utilizing the above-mentioned technique invoked by screen savers requires that the computing device in question be continuously "operational". In this state, some level of power is continuously consumed by the computer, thus requiring some level of energy use. Conservationists would prefer that idle computing devices simply be shut down, thus not capable of consuming any power. In this state, complete energy conservation is more achievable. As should be obvious, this creates a natural conflict that does not have an easy solution.

As one potential alternative, it is possible to look to other products and computing devices which may provide better alternatives. Candidates for possible use may include mobile computing devices or mobile phones which typically are powered to remain operational. However, communication with such devices, and the ability to make use of their potential processing power, is complicated due to available communication bandwidths, etc. Additionally, computing power may also be somewhat limited, thus narrowing the type of projects which may potentially be appropriate.

BRIEF SUMMARY OF THE INVENTION

The present invention makes use of computing power available in mobile computing devices and specifically mobile phones. These devices are good candidates for grid computing applications as they are continuously powered and available for potential assignments. Additionally, the present invention provides an appropriate communication protocol which allows for efficient communication between the computing systems and mobile phones.

Generally speaking, the present invention utilizes available mobile phones which are registered as clients on a grid computing system. When assignments are available, the system detects availability of these clients, and pushes computing projects to the mobile phones for processing during available processing cycles. These processing projects are communicated utilizing a communication protocol appropriate for mobile phones. More specifically, the computer projects are communicated via SMS text messages, which can easily be handled by the phone and the mobile network carrying the communication.

In order to allow the communication of sizeable amounts of data, the assignments are communicated in a compressed communication methodology which will more efficiently pass computing projects as necessary. This communication methodology generally involves the communication of a lookup table, and subsequent communication of data which can be decompressed utilizing the received lookup table. In this manner, discrete SMS text messages can be sent which contain portions of the overall message. Similarly, the mobile phone can also communicate back to the grid computing system in this same manner.

Using these techniques, mobile phones can be incorporated into a grid communication system without requiring continuous network connection. Further, existing messaging capabilities are utilized to provide message communication in an efficient manner.

BRIEF DESCRIPTION OF THE DRAWINGS

Further objects and advantages of the present invention can be seen by reading the following detailed description, in conjunction with the drawings in which.

DETAILED DESCRIPTION OF THE INVENTION

Figure 1:
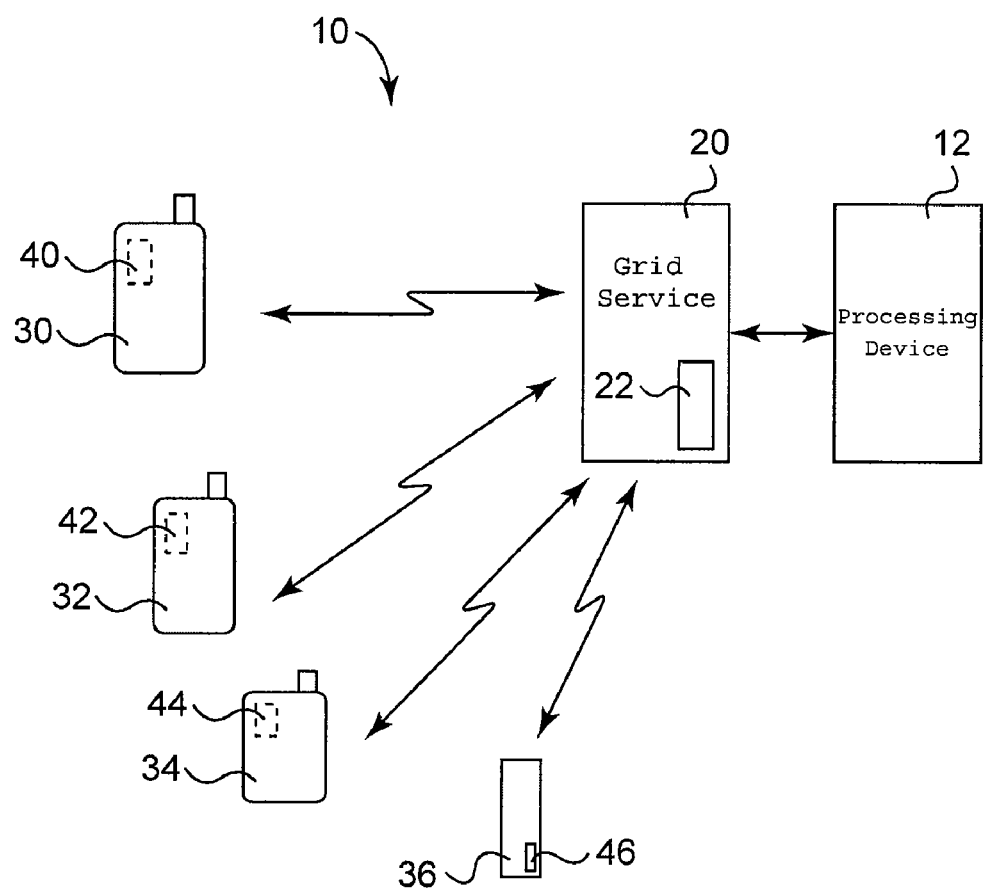
FIG. 1 is a block diagram illustrating the components of the grid computing system.

The grid computing system of the present invention makes use of existing communication networks and existing capabilities to provide additional computing power. One embodiment of grid computing system 10 is illustrated in FIG. 1. The basic components of this embodiment include a processor or processing device 12, in communication with grid service 20. Processing device 12 will generally identify those projects which are appropriate for distributed grid computing techniques. This task is then passed to grid service 20 for further processing. Generally speaking, grid service 20 is configured to perform necessary coordination and management, to utilize the processing power of multiple related devices. As will be further outlined below, these steps generally include the separation or partitioning of the processing task into several small chunks which are capable of being processed in parallel, along with coordinating communication to appropriate processing devices.

As generally discussed above, the present invention utilizes the existing processing power of mobile phones, which are typically continuously powered and oftentimes in idle states of operation. Referring to FIG. 1, a first mobile phone 30, second mobile phone 32, third mobile phone 34 and fourth mobile phone 36 are illustrated. Naturally, the typical grid contemplated by the present invention is much larger than four mobile phones, however these four are represented here for illustrative purposes. To help grid service 20 manage the operations of the various mobile phones, or agents, an agent registration list 22 is maintained by a grid service 20. Agent registration list 22 will contain information regarding each particular agent, including its addressing information and potentially information regarding its processing capabilities.

Grid computing system 10 of the present invention contemplates the use of various types of agents for additional processing power. That said, the availability of "noncontinuously connected" agents is specifically contemplated. The most obvious of these devices are mobile phones, as mentioned above, since they are not typically network connected at all times, however are available via cellular communication techniques. As such, the grid service of the present invention provides capabilities to make contact with these agents when necessary. Stated alternatively, the present invention will broadcast or push work to the agents making up the grid computing system. Consequently, agents themselves are not responsible for monitoring or checking availability at all, rather simply respond to received messages.

Referring again to FIG. 1, first mobile phone 30 is illustrated to include a first agent utility or code 40, which operates within first mobile phone 30 to provide a program grid computing agent functionality. Similarly, second agent utility 42 exists within second mobile phone 32, third agent utility 44 exists within third mobile phone 34 and fourth agent utility 46 exists within fourth mobile phone 36.

Figure 2:
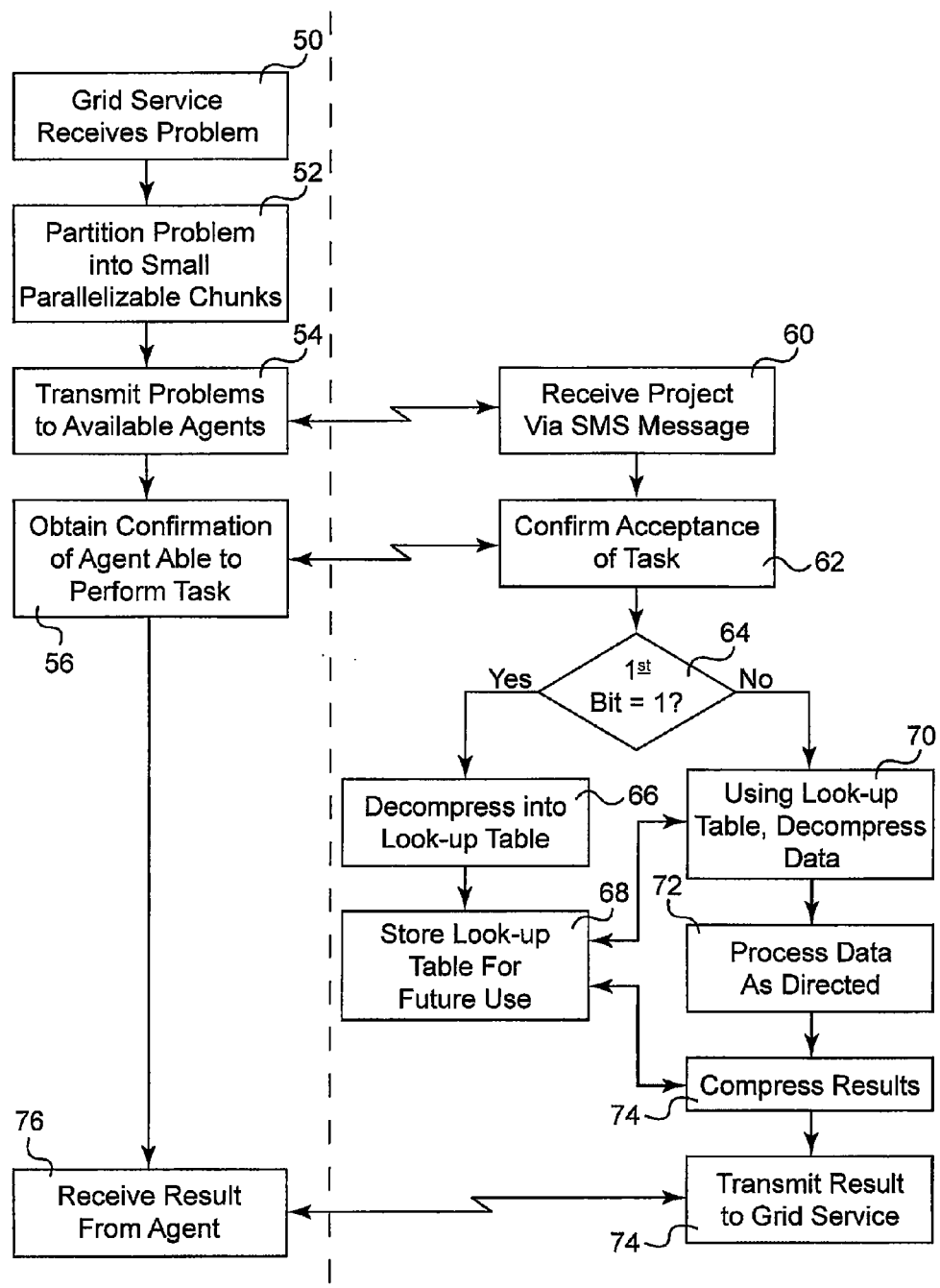
FIG. 2 is a flowchart illustrating the process carried out during use of the grid computing system.

Referring now to FIG. 2, one exemplary operating process is illustrated in flowchart form. As will be discussed below, the steps carried out by grid computing system 10 coordinate operation of the particular agent involved and grid service 20, to provide overall operation. Generally speaking, this process begins at step 50 where grid service 20 will receive the general processing problem. Next, at step 52 the "problem" or "project" is partitioned into small parallelizable chunks. Stated alternatively, the project is broken into parts, with each part generally being more appropriate for processing by mobile phones within the grid system of the present invention. These chunks will generally be of very small size capable of easy communication to the mobile phones in manageable messages, and preferably less than 160 bytes in size. In a preferred embodiment, this limit of 160 bytes is governed by the present limit for existing SMS messaging.

Once the problem is partitioned appropriately, portions are transmitted to available agents at step 54. Again, users will register their phone number with the grid system, or the grid system will maintain a record of registered users. Naturally, the method of transmission for the present invention can be carried out in different ways. In one embodiment, the message is generally transmitted to a large number of potential users (general broadcast method). Alternatively, the message may be targeted to a specific user. In either case, grid service 20 then waits for appropriate confirmation at step 56.

Similar processing steps must obviously be carried out by the mobile phone during processing. The following description will refer to the use of first mobile phone 30 as the processing agent, however, it will be understood that any one of the mobile phones part of the grid service would carry out similar steps. Again, mobile phone 30 in the process of the present invention will receive a project from grid service at step 60 via an appropriate SMS message. In this particular embodiment, mobile phone 30 will then transmit a confirmation back to grid service 20 at step 62 thus indicating their availability to accept the transmitted task.

As one alternative, not shown in FIG. 2, the confirmation steps outlined above could easily be omitted. In this alternative embodiment, grid service 20 would simply broadcast the assignment to all potentially available mobile phones, and then simply await a result. Further, the mobile phone would receive the project and immediately perform appropriate processing, thus returning the result once completed. Obviously, this creates the potential for widespread parallel processing which would be unnecessary completed by multiple mobile phones at a single time. Should this parallel processing be deemed inefficient or unnecessary, grid service 20 may limit its distribution to a small amount of targeted mobile phones, or may take alternative steps to increase efficiently. Alternatively, the project may be targeted towards a single mobile phone, and when the result is not returned after a period of time, the project could then be transmitted to the next potentially available mobile phone. These work allocation and work management variations would be handled by appropriate protocols within grid service 30.

Returning to the flowchart of FIG. 2, once first mobile phone 30 receives and confirms acceptance of the various tasks, various message handling techniques are included to provide significant processing capabilities. As mentioned above, the present invention contemplates the use of SMS messaging to provide communication to the mobile phones. SMS messages received by the mobile phone would be quickly identified by the agent, and processed in the background. In this manner, SMS messages provided by grid service 20 would be handled separately and not moved to the phone's message inbox as typically done with current SMS messaging.

Due to the size limitations of typical SMS messages, the present invention sends chunks of the message as compressed payloads. Typically, the type of data used in these grid processing projects includes arrays of floating point numbers. In these applications, the data does not need to be streamed but rather needs to be highly compressed. As such, a compression scheme can be used whereby the entire data set, at the grid service 20, is broken into multiple small chunks (a), and then processed for frequency occurrence of sequences of data, to thus provide a lookup table for that chunk. The data in the particular chunk identified is then compressed using the frequency lookup table and divided into a number of smaller chunks (b), with each of these smaller chunks being within the SMS size limitation (i.e. less than 160 bytes in size).

To aid in transmission, the frequency lookup table is then compressed using standard well known compression techniques so that it will also fit within the SMS size limitations. The present invention then transmits this lookup table as the first SMS message to the mobile phone. This lookup table will be uniquely identified by the nature of the SMS messages being sent. For example, a first identifier bit may be a "1", thus identifying the remainder of the message as a lookup table, wherein a first bit of "0" identifies the remainder as data.

Referring again to FIG. 2, this messaging technique is recognized and deciphered by mobile phone 30 during the receipt process. More specifically, step 64 examines the first bit of a received SMS message to determine if that bit is a "1". If yes, the process moves to step 66 wherein a lookup table is decompressed, and then stored for future use in step 68. Alternatively, should step 64 identify the first bit as a "0" the system then moves on to step 70 wherein the subsequent messages are decoded or decompressed utilizing the lookup table. Following this decompression, and receipt of all messages making up the "project" appropriate processing is carried out. This processing takes place in step 72 as illustrated in the flowchart of FIG. 2. Once a result is compiled, step 74 similarly compresses the results utilizing the same lookup table. Next, step 76 transmits the result, in a compressed format, to the grid service. The grid service then receives the result from the agent at step 76 and further processes the result appropriately.

Generally speaking, the system outlined above uses a combination of standard compression for bootstrapping the rest of the message sequence using an adaptive compression scheme for each particular data set. While this particular technique has been found appropriate for the embodiment outlined above, further compression techniques could be utilized in order to appropriately fit messages.

While certain embodiments in the invention have been described above, they are not intended to be limiting in any way, but rather illustrative of the concepts of the present invention. That said, the applicant intends the invention to include all variations and modifications coming within the scope and spirit of the following claims.

What is claimed is:

1. A method for distributed computing of complex computing tasks using available computing power of mobile computing devices registered as part of a grid computing system, comprising:

identifying by a processing device, a computing project appropriate for parallel processing by a mobile computing device which is a portion of the complex computing task;

detecting an available mobile computing device within the grid computing system which is presently connected but not in use;

pushing the computing project to the available mobile computing device via predetermined communication protocol utilizing Short messaging Service (SMS) messaging, wherein the predetermined protocol allows for compressed message communication by first sending a look-up table via compressed SMS messaging which can be stored by the mobile computing device for future use and subsequently sends compressed data which can be decompressed by the mobile computing device using the look\-up table; and monitoring responses from the mobile computing device to determine if a result of the computing project is received within a predetermined period of time, wherein responses will be transmitted using the predetermined communication protocol, and if the response includes the result of the computing project the result is thus incorporated into the complex computing task, and wherein if the result is not received within a predetermined period of time, the computing project is cancelled and is pushed to an alternative available mobile computing device, wherein the project will be continually pushed to available mobile computing devices until the result is received.

* * * * *